Feb. 6, 1951 H. E. NEVILLE 2,540,543
VERTICAL LIFT AIRCRAFT CONTROL
Filed Feb. 3, 1945 4 Sheets-Sheet 1

INVENTOR.
HARVEY E. NEVILLE
BY
Eber J. Hyde
ATTORNEY

Feb. 6, 1951  H. E. NEVILLE  2,540,543
VERTICAL LIFT AIRCRAFT CONTROL
Filed Feb. 3, 1945  4 Sheets-Sheet 2

INVENTOR.
HARVEY E. NEVILLE
BY
Elmer J. Hyde
ATTORNEY

Feb. 6, 1951  H. E. NEVILLE  2,540,543
VERTICAL LIFT AIRCRAFT CONTROL
Filed Feb. 3, 1945  4 Sheets-Sheet 4

INVENTOR.
Harvey E. Neville
BY
Eber J. Hyde
Attorney

Patented Feb. 6, 1951

2,540,543

UNITED STATES PATENT OFFICE 2,540,543

VERTICAL LIFT AIRCRAFT CONTROL

Harvey E. Neville, Shaker Heights, Ohio

Application February 3, 1945, Serial No. 575,951

20 Claims. (Cl. 170—135.24)

My invention pertains to vertical lift aircraft, and more particularly to means for controlling such aircraft.

An object of my invention is to provide simple yet rugged control means for vertical lift aircraft.

Another object of my invention is to provide a control system for vertical lift aircraft which terminates in a control box within the pilot's compartment, and to have the control box movable within said compartment.

Still another object of my invention is to provide a control system for vertical lift aircraft utilizing co-axial counter-rotating rotors as well as those utilizing a single rotor with a smaller torque compensating tail rotor.

It is also an object of my invention to provide a control system for vertical lift aircraft which is adaptable to mass production.

A further object of my invention is to provide a control system for vertical lift aircraft which can be easily replaced should trouble occur.

Other objects and a fuller understanding of my invention may be had by referring to the following description, claims and drawings wherein:

There has long been a need for a simple, inexpensive yet rugged, and dependable control system for controlling the vertical, horizontal, and rotational (turning) motion of vertical lift aircraft.

Figure 1:
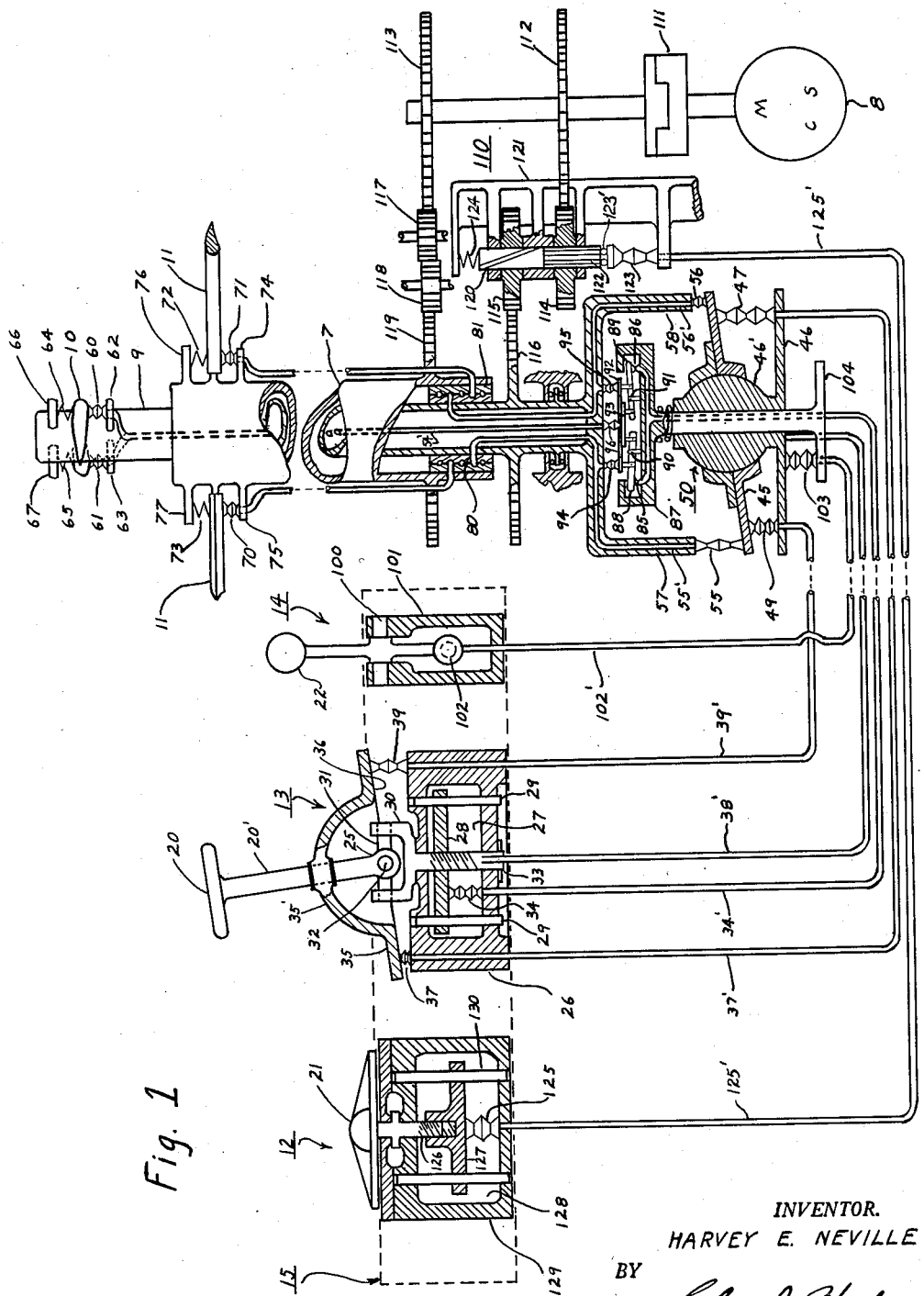
Figure 1 is a schematic diagram, partially in cross-section, of the details of a control system for vertical lift aircraft utilizing two counter-rotating rotors.

My device provides such a control, and for a vertical lift aircraft having two co-axially mounted counter-rotating rotors such as are indicated by the reference characters 10 and 11 in Figure 1, it comprises three manually operated control devices, 12, 13, 14. These three control devices may be mounted in a box (schematically indicated by the dotted line 15) positioned within the pilot's compartment, and the three individual controls may extend from inside the box 15 through the wall of the box to the outside thereof, terminating in knobs or handles whereby the pilot may readily operate them.

The control device 13 has a stick or wheel 20 which may be tilted and which may also be turned. The tilting motion controls the horizontal motion of the aircraft and the turning motion the rotation of the aircraft about its vertical axis. The control device 12 has a handle 21 which may be turned to change the relative positions of the two rotors 10 and 11, for reasons more fully described later. The control device 14 includes a handle 22 for controlling the vertical motion of the aircraft.

The control wheel 20 is mounted by means of a universal joint 25 on a base 26 which has an enclosed central open portion 27. Within the open portion is a plate 28 floating on pins 29 which are anchored in the top and bottom walls of the base 26. A yoke 30 has a threaded shaft 33 extending through the floating plate 28. The yoke 30 is connected to shaft 20' of the wheel 20 by means of the spider 31, and the joint 32 allows pivotal motion of the wheel and shaft 20, 20' with respect to the yoke 30. When the wheel 20 is turned, thereby turning the threaded shaft 33 with respect to the plate 28, the floating plate 28 is moved up or down within the open space 27 depending upon the direction of turning, and the hydraulic bellows device 34 which is mounted between the plate 28 and the base 26 is caused to expand or contract. A plate 35 having a raised central portion 35' is connected to the wheel shaft 20' in such a way that it does not rotate with the shaft and yet is rigidly held axially with respect to the shaft. The bottom face 36 of the plate 35 defining a plane and three or more hydraulic bellows devices, 37, 38, and 39 (only two are shown in Figure 1; see Figure 2) are positioned between the top face of the base 26 which defines a plane and the bottom face 36 of the plate 35, which, when in its neutral position, defines a plane parallel to the plane of the base 26. Tilting motion of the control wheel 20 in any direction will tip the plate 35 in the same direction and to the same extent, and this will depress some of the bellows and extend others in accordance with the degree and direction of movement.

The hydraulic bellows 37, 38, and 39 are connected respectively, to the ends of the hydraulic lines 37', 38', and 39', and hydraulic bellows 47, 48, and 49 are connected, respectively, to the other ends of the hydraulic lines. The bellows 47, 48, 49 are mounted between a flat plate 46 having an integral ball 46' which comprises part of a universal joint and a wobble plate 45 whose underneath surface defines a plane which normally is parallel to the plane defined by plate 46. The wobble plate 45 is mounted on the ball 46' for tilting motion with respect thereto. Tilting of the plate 35 by the control wheel 20 causes, by hydraulic transmission, a corresponding tilting of the wobble plate 45. The plane defined by the upper surface of the wobble plate 45 passes through the center of the universal joint which is indicated in its entirety by the reference character 50.

Figure 2:
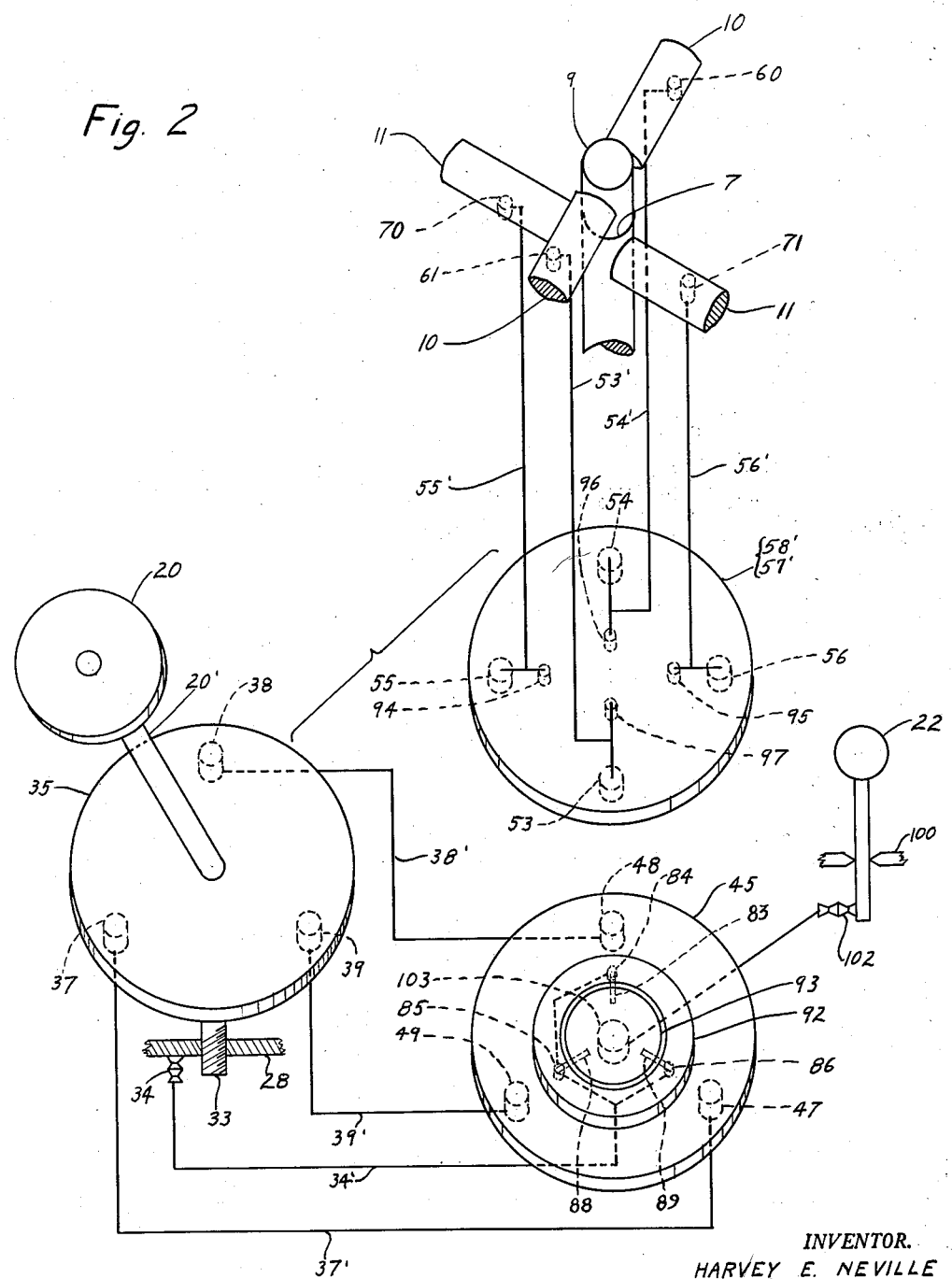
Figure 2 is an exploded schematic diagram, in isometric, of the same control system.

Two pairs of followers 53, 54 and 55, 56 engage the upper surfaces of the wobble plate 45 and each pair controls the pitch motions of one of the rotors 10, 11. The two pairs of followers 53, 54 and 55, 56 are shown in Figure 2. In Figure 1 I show, for the sake of clarity, only one pair, namely 55, 56, which control the pitch of rotor 11. The pair of followers 55, 56 (shown as hydraulic bellows), engage the upper surface of the wobble plate 45 and are in hydraulic communication with hydraulic lines 55' and 56' which extend through the arms 57 and 58 (two similar arms hold the bellows 55, 56 but are not shown in Figure 1) for transmitting hydraulic pressure as the bellows 55, 56 are squeezed or extended between the wobble plate 45 and the ends of the arms 57, 58. The arms 57 and 58 are extensions of the shaft 9 on which the rotor 10 is mounted and rotate with respect to non-rotatable wobble plate 45 as the rotor 10 is driven by the motor 8 in a manner to be described later in detail; or the arms 57, 58 and the other two arms which are not shown may be replaced by an inverted cup-shaped plate 57', 58' shown schematically in Figure 2. The rotor 11 is mounted co-axially with respect to the rotor 10 on a shaft 7 and is also driven by the motor 8. Similar arms and bellows are utilized for controlling the pitch motions of the rotor 10, and the control bellows ride around the wobble plate 45 in a manner similar to the manner in which the bellows 55, 56 ride around the wobble plate 45.

The rotor 10 is connected to the shaft 9 and the rotor 11 is connected to the shaft 7 in a manner to permit independent pivotal motion of each of the two blades of the two rotors about their longitudinal axes with respect to the axis of the shafts. The amount of pivot or pitch of these rotors controls the flight of the aircraft as is well known to one skilled in the art.

For controlling the rotor 10 I mount a pair of hydraulic bellows units 60, 61, one for each rotor blade, on extension plates 62, 63 connected to the shaft 9. The upper end of each of the bellows engages a portion of one of the rotor blades at a point offset from its longitudinal axis so that extension of the bellows will change the pitch of the blade, and compressed springs 64, 65 are mounted between the blades and fixed extension plates 66, 67 for changing the pitch of the blades when the bellows contract. The blades of rotor 11 are similarly mounted between bellows 70, 71 and springs 72, 73. The bellows are mounted on extension plates 74, 75 and the springs on extension plates 76, 77. As I have mentioned, Figure 1 shows only two arms 57, 58 carrying on their ends bellows 55, 56 for controlling the rotor 11. It is to be understood that two other similar arms (not shown for the sake of clarity) each carrying a hydraulic bellows (shown as 53 and 54 in Figure 2) are used in a similar manner to control the bellows 60, 61 associated with the rotor 10. Changing the pitch of the rotors cyclically during their rotary motion controls the horizontal motion of the aircraft.

Uniformly changing the pitch of one of the rotors in one direction by a certain fixed amount and simultaneously changing the pitch of the other rotor by the same amount but in the opposite direction causes the aircraft to slip about its vertical axis. This control action is obtained by turning control wheel 20 thereby raising or lowering the plate 28, and compressing or extending the bellows unit 34. Connected to the bellows unit 34 is a hydraulic line 34' leading to two or more hydraulic bellows 84, 85, 86 positioned between a stationary plate 87 and one end of each of the levers 83, 88, 89, respectively. The levers 88, 89 (shown in Figure 1) are pivoted at 90, 91. Between the bellows units and the pivot points each of the levers is connected to an annular ring 92, and on the other side of the pivot points the levers are connected to a central disc 93. The points of connection between the levers and the ring and the levers and the disc are equally spaced on either side of the pivot points of the three levers. Accordingly, when the levers are actuated by the hydraulic bellows the plate 93 and the disc 92 will move equal amounts in opposite directions and will maintain their parallel relationship.

Two pairs of hydraulic bellows units 94, 95 and 96, 97 are connected, respectively, to the extended arms 57 and 58 and to two similar arms (not shown) and rotate as the arms rotate. The disc 92 and the plate 93 do not rotate, and so the bellows 94, 95, 96, 97 may be termed "followers." The bellows 94 communicates hydraulically with the hydraulic line 55' leading to the bellows unit 70 which controls one blade of the rotor 11, and the bellows 95 communicates hydraulically with the hydraulic line 56' leading to the bellows unit 71 which controls the other blade of the rotor 11. The bellows 96, 97 communicate with bellows 60, 61 by means of hydraulic lines 54', 53' and thereby control the pitch of the blades of the rotor 11. Thus the pitch of the two blades of the rotor 11 are equally controlled and in the same sense. The bellows 96, 97 (shown in Figure 2) follow the disc 93 and transmit control pressures through the hydraulic lines 54', 53' to the bellows 60, 61 which control the pitch of the two blades of the rotor 10. As the ring 92 and the disc 93 move equally but in opposite directions the rotors 11 and 10 have their pitch controlled equally but in an opposite sense, thus controlling the turning motions of the aircraft.

The control lever 22 is mounted by means of a pivot 100 in a housing 101 and when it is moved it compresses or extends a bellows 102. The movement of the lever 22 simultaneously changes the pitch in both of the rotor blades 10 and 11 to control the up and down movement of the aircraft. This is done in the following manner. Bellows 102 is connected by means of the hydraulic line 102' to the bellows 103 which is supported between a fixed plate 104 and the plate 46 which supports the universal joint 50. The hydraulic forces are thereby transmitted from the bellows 102 to the bellows 103 thereby raising or lowering the plate 46 with respect to the fixed plate 104. When the plate 46 is moved with respect to the fixed plate 104 the parallel relationship is maintained. Thus the bellows 53, 54 and 55, 56 are compressed or extended by equal amounts no matter whether the plate 45 is tilted or is parallel to the plate 46. Compression or extension of the bellows 53, 54 and 55, 56 will actuate the bellows associated with the respective blades of rotors 10, 11 to change the pitch of the blades by equal amounts, as has been previously described. The arrangement of the hydraulic followers 53, 54 and 55, 56 is such that the angle or pitch of the rotor blades will be the same at two fixed diametrically opposite points on their circle of rotation (no matter in which direction the blades are rotated) when only the wobble plate 45 is controlling the blades. This will permit horizontal motion of the aircraft in either direction perpendicular to the diameter connecting these two fixed points, when the control stick 20 is tipped in either direction. In my invention I add a device indicated generally by the reference character 110 to change the relative phase position of one set of rotor blades with respect to the other set of rotor blades within a limit of 180 degrees. This is done without interrupting the rotation of either rotor and will alter the azimuthal relation between the points on the circles of rotation of the respective rotors at which the pitch of the rotor blades is maximum. This permits varying the direction of the horizontal component of thrust acting on the aircraft. This will cause horizontal motion of the aircraft in any direction.

The counterrotating shafts 7 and 9 are normally geared to the drive shaft of the motor 8 in such a manner that their rotation is positive with relation to each other. This positive relationship can be altered by a small amount (not over 180 degrees), and hydraulic couplings 80, 81 permit the transmission of hydraulic pressures from the bellows 55, 94 to the bellows 70, and from the bellows 56, 95 to the bellows 71 no matter what the rotational position of the shaft 9 is with respect to the shaft 7.

The rotor blades are driven by the motor 8 through a clutch device 111 and through two gears 112 and 113. The gear 112 meshes with the gear 114 and the torque is transmitted to the gear 115 which is in toothed engagement with the gear 116. The gear 116 drives the shaft 9 on which is mounted the rotor 10. The gear 113 through gears 117 and 118 and 119 drives the shaft 7 on which is mounted the rotor 11. The device 110 for changing the relative phase position of the rotor 10 with respect to the rotor 11 comprises the two pinion gears 114 and 115 which are connected together by a helical spline 120. The two pinion gears 114 and 115 are held against axial movement by the framework 121 but the shaft 122 is free to move under the influence of forces from the bellows 123 transmitted through bearing 123'. The gear 114 is mounted on a splined section of the shaft 120 in such a way that rotational drive is positive. However, if the shaft 120 is moved axially by the bellows 123 in order to compress the spring 124 no relative rotational motion of the gear 114 with respect to the shaft 120 takes place. The other gear 115, however, is mounted on the helically cut spline portion of the shaft 120 in such a way that the gear 115 is rotated relative to shaft 120 within the limit of 180 degrees by the axial movement of the shaft 120. The bellows 123 which is utilized for moving the shaft 120 back and forth is connected by means of the hydraulic line 125' to the bellows 125 in the control compartment. The bellows 125 may be compressed or extended by turning the handle 21 which by means of a threaded shaft 126 causes the floating plate 127 to move up and down in the hollow portion 128 of the housing 129. The plate 127 is pinned within the housing by means of pins 130. When the plane is in flight and the pilot wishes to control the horizontal motion of the aircraft he does so by turning the handle 21. As has been explained this, through the helical spline 120, causes a phase displacement of the rotor 10 relative to the rotor 11 but only for a very limited angular displacement, that is, within 180 degrees. It does not change the location of the hydraulic followers which are in contact with the wobble plate 45 and accordingly allows the blades of both rotors to intercept their respective hydraulic followers at any point on the circle of rotation at the will of the pilot.

The fluid columns from the lower bellows to the upper bellows might oscillate if they are too long, so it is within the scope of my invention to mount the wobble plate up near the rotors 10, 11, thereby reducing the length of the fluid columns. However, I prefer to have the wobble plate and its followers within the fuselage of the plane where they are protected from ice. Proper design of the hydraulic lines, including factors such as the length of the lines, their diameter, the fluid used, and the rate of rotation of the rotors can be such as to reduce oscillation; and furthermore, special damping devices may be used.

Figure 3:
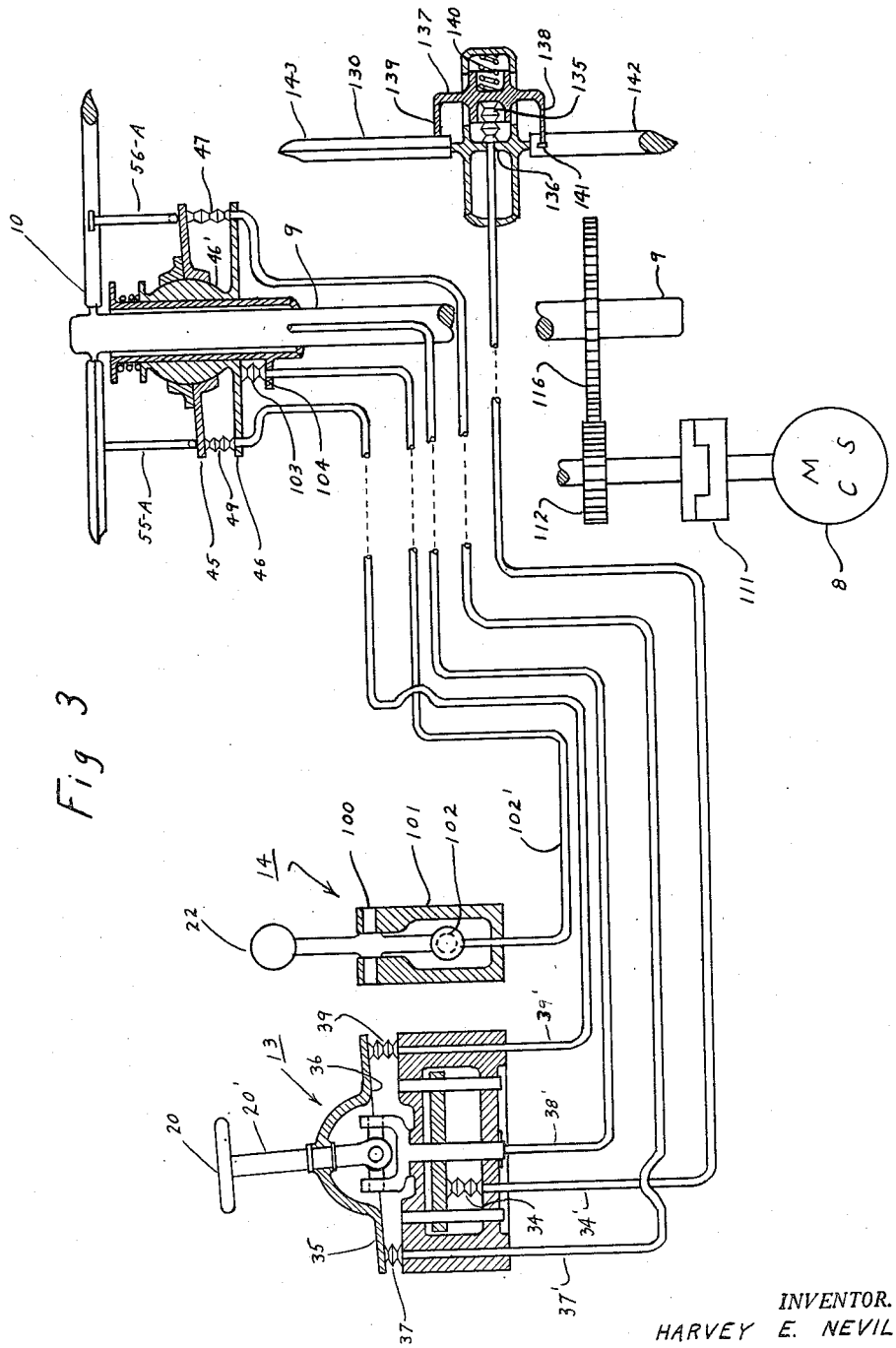
Figure 3 is a schematic diagram, partially in cross-section, of the details of a control system for vertical lift aircraft utilizing a single rotor for lift and a torque stabilizing tail rotor.
Figure 4:
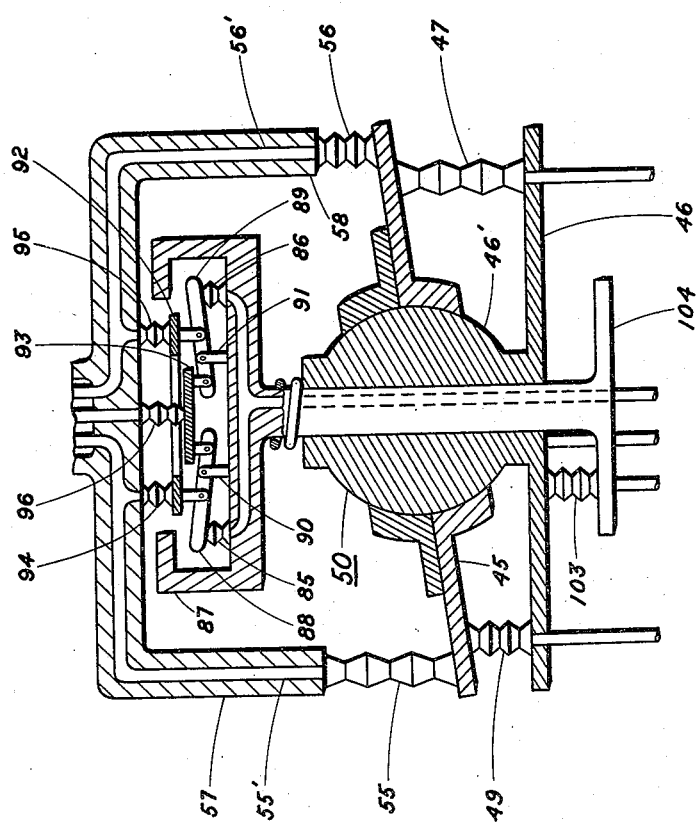
Figure 4 is a cross-sectional view on an enlarged scale of a portion of the device shown in Fig. 1.

In Figure 3 there is illustrated a modified form of my control system wherein the aircraft has only a single overhead rotor and utilizes a tail rotor 130 to counterbalance the torque of the overhead rotor.

The control device 13 may be constructed exactly like the control device 13 in Figure 1, and may control the single rotor 10 in the same manner as the rotor 10 of Figure 1 is controlled. Figure 3, however, illustrates a modification wherein the hydraulic follower systems 55 and 56 of Figure 1 is replaced by a mechanical follower system. The mechanical follower system is comprised of two mechanical links or power transmitting devices 55—A and 56—A, one for each of the blades of the rotor 10, whose lower ends are in engagement with the top surface of the wobble plate 45, and whose upper ends are connected to the rotor blades in such a manner that as the blades and followers rotate around the stationary wobble plate 45 the followers cause the pitch of the blades to change in accordance with the tilt of the wobble plate.

The bellows 34 which is compressed or extended by turning the wheel 20 is connected by means of hydraulic line 34' to the bellows 135 mounted in the tail of the aircraft. One end of the bellows 135 abuts against the fixed plate 136 and the other end abuts against the movable plate 137 in such a manner that as the bellows expands it compresses the spring 140 and as it contracts it allows the spring 140 to expand. Connected to the movable plate 137 are two arms 138 and 139. The arm 138 engages a projection 141 on the rotor blade 142 and the arm 139 engages a similar projection on the rotor blade 143, and as the plate 137 moves in accordance with the pressures applied to the bellows 135 its transmits the motion to the rotor blades 142, 143. The projections on the rotor blades are at a distance from the longitudinal axis of the rotor blades and the blades are pivotally mounted. Accordingly, the pitch of the blades 142, 143 is changed in response to the turning of the wheel 20. Power for rotating the tail rotor 130 may come from the motor 8 by any suitable power transmission train.

While I have shown bellows devices it is to be understood that hydraulic piston devices may also be used. It is also possible to use mechanical followers in the place of the hydraulic followers 53, 54 and 55, 56, although the hydraulic (bellows or pistons) are preferred. It is also within the scope of my invention to utilize a mechanical linkage system for actuating the helical spline 120 in Figure 1.

The hydraulic lines 125', 37', 34', 38', 39' and 102' may be flexible, and when such is the case the box 15 within which the control units 12, 13, and 14 are mounted may be moved about in the pilot's compartment.

While I have described my invention with a certain degree of particularity it is to be understood that numerous changes can be made in the parts and their relation to each other without departing from the spirit and scope of my invention.

I claim as my invention:

1. In a vertical lift aircraft having two multi-bladed rotors which rotate in opposite directions about a substantially vertical axis and the blades of which are mounted for pivotal or pitch motion about their horizontal axes; first control means actuated by the pilot of said aircraft for controlling the horizontal motion of said aircraft, said first control means including a tiltable plate defining a plane whose position is tilted by actuation of said first control means only, a single wobble plate defining a plane, at least three control circuits connected to said tiltable and wobble plates and operated by the tilting motions of said tiltable plate for causing said wobble plate to tilt accordingly, first and second rotor blade control circuits controlled by the tilting motions of said wobble plate and extending from said wobble plate to the blades of said first and second rotors respectively to simultaneously cause cyclic changes in the pitch of said rotor blades during each rotation thereof; pilot actuated second control means including a vertical lift control circuit connected to said wobble plate for moving said wobble plate from one position defining a plane to a second position defining a plane parallel to said first plane, said motion from one plane to another plane parallel thereto controlling both of said rotor blade pitch control circuits simultaneously to cause a like non-cyclic change in the pitch of the blades of both rotors.

2. In a vertical lift aircraft having two multi-bladed rotors the blades of each of which are mounted for pivotal or pitch motion about their longitudinal axes; first control means actuated by the pilot of said aircraft, and including a tiltable plate defining a plane whose position is tilted by actuation of said first control means, a wobble plate defining a plane, at least three control circuits connected to said tiltable and wobble plates and operated by the tilting motions of said tiltable plate for causing said wobble plate to tilt accordingly, first and second rotor blade control circuits controlled by the tilting motions of said wobble plate and extending from said wobble plate to the blades of said first and second rotors respectively to simultaneously cause cyclic changes in the pitch of said rotor blades during rotation thereof; pilot actuated second control means including a control circuit connected to said wobble plate for moving said wobble plate from one position defining a plane to a second position defining a plane parallel to said first plane, said motion from one plane to another plane parallel thereto controlling both of said rotor blade pitch control circuits simultaneously to cause a like non-cyclic change in the pitch of both of said rotors.

3. In a vertical lift aircraft as set forth in claim 1, the further characterization that said control circuits are hydraulic circuits.

4. In a vertical lift aircraft as set forth in claim 1, the further characterization that said at least three control circuits are hydraulic circuits including at least three bellows means one in each circuit actuated by said tiltable plate and including at least three bellows means one in each circuit in force transmitting relationship with said wobble plate, each of said at least three control circuits extending from one of the bellows means actuated by said tiltable plate to one of the bellows means in force transmitting relationship with said wobble plate.

5. In a vertical lift aircraft as set forth in claim 1, the further characterization that said at least three control circuits are hydraulic circuits, and the vertical lift control circuit is also a hydraulic circuit.

6. In a vertical lift aircraft as set forth in claim 2, the further characterization that said control circuits are hydraulic circuits.

7. In a vertical lift aircraft as set forth in claim 2, the further characterization that said at least three control circuits are hydraulic circuits including at least three bellows means one in each circuit actuated by said tiltable plate and including at least three bellows means one in each circuit in force transmitting relationship with said wobble plate, each of said at least three control circuits extending from one of the bellows means actuated by said tiltable plate to one of the bellows means in force transmitting relationship with said wobble plate.

8. In a control system for vertical lift aircraft having two coaxially mounted counter-rotating rotors, an engine, first power transmission means from said engine to the first of said rotors, second power transmission means from said engine to the second of said rotors, the second of said power transmission means including phase shifting means for rotating one of said rotors with respect to the other of said rotors by an amount not greater than 180 degrees, and control means connected to said phase shifting means and actuatable by the pilot of said aircraft for controlling said phase shifting means.

9. In a control system as set forth in claim 8, the further characterization that said control means is a hydraulic system.

10. In a control system as set forth in claim 8, the further characterization that said first and said second power transmission means each directly couples one of the said rotors to said engine and include gear means, and said second transmission means includes a helical spline gear driven by said engine and means for mounting said spline gear for axial motion with respect to a pinion gear which meshes with said helical spline gear and also meshes with means for rotating one of said rotors, and means whereby said control means, upon being actuated, moves said helical spline gear axially to cause said pinion gear to rotate.

11. In a control system aso set forth in claim 8, the further characterization that said first and said second power transmission means comprise gear chains each of which directly couples one of the rotors to the said engine, the said gear chain in the said transmission means which includes means for independently rotating a rotor including a helical spline gear driven by said engine and meshing with a pinion gear for rotating said rotor, means for mounting said helical spline gear for axial movement relative to said pinion gear without interrupting the transmission of power from said engine to said rotor, and means whereby said control means, upon being actuated, moves said helical spline gear axially to cause said pinion gear to rotate.

12. In a vertical lift aircraft, a first and a second multi-bladed rotor, a first drive shaft connected to said first rotor and a hollow second drive shaft connected to said second rotor coaxially mounted around said first drive shaft, a first power transmission means connected to said first drive shaft and a second power transmission means connected to said second drive shaft; said first and said second power transmission means including means for driving said two drive shafts in opposite directions whereby said two rotors move in opposite directions, means for controlling the pitch of the blades of said rotors and including only a single wobble plate and follower means in engagement with said single wobble plate for controlling the pitch of the blades of both of said rotors during rotation of said rotors, said wobble plate being mounted below the end of said second drive shaft whereby it and said follower means may be positioned within the aircraft for protection from the weather, and one of said power transmission means including means for rotating one of said rotors with respect to the other of said rotors thereby shifting the phase relationship of said first and second rotors.

13. In a control for a vertical lift aircraft having a rotor with a plurality of blades; a wobble plate; first pilot actuated control means connected to said wobble plate for determining the tilt position of said wobble plate; a plurality of blade actuating means, one for each of said blades; a plurality of hydraulic circuit means, one for each of said blades, in engagement with said wobble plate and each in engagement with one of said blade actuating means for cyclically controlling the pitch of the blades in accordance with the tilt position of said wobble plate; second pilot actuated control means; a plurality of hydraulic compression and expansion units, one for each of said blades, controlled by said second pilot actuated control means; means connecting each of said hydraulic compression and expansion units respectively to a different one of said hydraulic circuits whereby each of said blade actuating means is served by only a single hydraulic circuit and each of said blades is simultaneously controlled through said circuit in accordance with the algebraic summation of the fluid displacement produced by the two control motions of the pilot.

14. The invention as set forth in claim 13, further characterized in this: that said first and second pilot actuated control means include a single common control which the pilot moves in two distinct manners to effect two control operations on said blades.

15. In a control for a vertical lift aircraft having a rotor with a plurality of blades; a wobble plate; first pilot actuated control means connected to said wobble plate for determining the tilt position of said wobble plate; a plurality of blade actuating means, one for each of said blades; a plurality of hydraulic circuit means, one for each of said blades in engagement with said wobble plate and each in engagement with one of said blade actuating means for cyclically controlling the pitch of the blade in accordance with the tilt position of said wobble plate; a second pilot actuated control means; a plurality of hydraulic compression and expansion units, one for each of said blades, controlled by said second pilot actuated control means; means connecting each of said hydraulic compression and expansion units respectively to a different one of said hydraulic circuits whereby each of said blade actuating means is served by only a single hydraulic circuit; and a third pilot actuated control means including means for moving said wobble plate from one position to another parallel position, whereby each of said blades is simultaneously controlled through its hydraulic circuit in accordance with the algebraic summation of the fluid displacement produced by three control motions of the pilot.

16. In a control system for a vertical lift aircraft having a first and a second multibladed rotor, pilot actuated control means, hydraulic means controlled by said control means, a pivoted member in engagement with said hydraulic means and adapted to move in accordance with pilot induced displacements within said hydraulic means, a first and a second movable member connected to said pivoted member on opposite sides of said pivot point, first connection means including hydraulic line means in engagement with said first movable member, first actuating means connected to said first connection means for controlling the pitch of the blades of said first rotor, and second connection means including hydraulic line means in engagement with said second movable member, second actuating means connected to said second connection means for controlling the pitch of the blades of said second rotor; said control means controlling the degree and direction of pivoting of the aircraft about its rotor axis.

17. In a control system for vertical lift aircraft having two coaxially mounted counterrotating rotors, an engine, a first power transmission means from said engine to the first of said rotors, a second power transmission means from said engine to the second of said rotors, the second of said power transmission means including phase shifting means for rotating one of said rotors with respect to the other of said rotors and control means connected to said phase shifting means and actuatable by the pilot of said aircraft for actuating said phase shifting means.

18. In a vertical lift aircraft the combination comprising two multibladed, counterrotating rotors; means for individually cyclically controlling the blade pitch of both of said rotors in accordance with pilot control motions, including a single wobble mechanism, pilot controlled means connected to the wobble mechanism for positioning the wobble mechanism, and means interconnecting the wobble mechanism with the blades of said two rotors; said single wobble mechanism being the sole wobble mechanism between the pilot controlled means and the blades of said rotors.

19. A vertical lift aircraft as set forth in claim 18, further characterized by second pilot controlled means connected to said wobble mechanism for positioning the wobble mechanism for simultaneous, uniform pitch change of the blades of both of said rotors.

20. A vertical lift aircraft as set forth in claim 18, further characterized by other pilot controlled means connected to the blades of both of said rotors by said means interconnecting the wobble mechanism with the blades of said two rotors for simultaneous mean differential pitch change of the blades of one said rotor with respect to the blades of the other said rotor.

HARVEY E. NEVILLE.

REFERENCES CITED

The following references are of record in the file of this patent:

UNITED STATES PATENTS

| Number | Name | Date |
|---|---|---|
| 1,623,049 | Dorsey | Apr. 5, 1927 |
| 1,836,406 | Smith | Dec. 15, 1931 |
| 1,864,236 | Evrard | June 21, 1932 |
| 1,919,089 | Breguet | July 18, 1933 |
| 1,921,805 | Bordoni | Aug. 8, 1933 |
| 2,021,470 | Upson | Nov. 19, 1935 |
| 2,070,610 | Myers | Feb. 16, 1937 |
| 2,256,918 | Young | Sept. 23, 1941 |
| 2,394,846 | Cox | Feb. 12, 1946 |
| 2,399,076 | Trice | Apr. 23, 1946 |
| 2,410,533 | Thomson | Nov. 5, 1946 |
| 2,435,080 | Hoover | Jan. 27, 1948 |
| 2,491,375 | Hardy | Dec. 13, 1949 |

FOREIGN PATENTS

| Number | Country | Date |
|---|---|---|
| 173,213 | Great Britain | Jan. 29, 1923 |